United States Patent
Harrison et al.

(10) Patent No.: US 9,663,223 B1
(45) Date of Patent: May 30, 2017

(54) AIRCRAFT BRAKING PERFORMANCE AND RUNWAY CONDITION DETERMINATION

(71) Applicant: The Boeing Company, Chicago, IL (US)

(72) Inventors: John E. Harrison, Bellevue, WA (US); John D. Anderson, Auburn, WA (US); Paul Giesman, Renton, WA (US)

(73) Assignee: The Boeing Company, Chicago, IL (US)

( * ) Notice: Subject to any disclaimer, the term of this patent is extended or adjusted under 35 U.S.C. 154(b) by 600 days.

(21) Appl. No.: 14/176,577

(22) Filed: Feb. 10, 2014

Related U.S. Application Data

(60) Provisional application No. 61/763,075, filed on Feb. 11, 2013.

(51) Int. Cl.
*B64C 19/00* (2006.01)

(52) U.S. Cl.
CPC .................................... *B64C 19/00* (2013.01)

(58) Field of Classification Search
CPC combination set(s) only.
See application file for complete search history.

(56) References Cited

U.S. PATENT DOCUMENTS

| | | | |
|---|---|---|---|
| 4,078,845 A | 3/1978 | Amberg et al. | |
| 4,120,540 A | 10/1978 | Devlieg | |
| 4,316,252 A | 2/1982 | Cooper | |
| 4,715,662 A | 12/1987 | Van Zanten et al. | |
| 4,958,512 A | 9/1990 | Johnsen | |
| 5,047,942 A | 9/1991 | Middleton et al. | |
| 5,050,940 A | 9/1991 | Bedford et al. | |
| 5,918,951 A | 7/1999 | Rudd, III | |
| 5,968,106 A | 10/1999 | Devlieg et al. | |
| 6,220,676 B1 | 4/2001 | Rudd, III | |
| 6,978,205 B2 | 12/2005 | Ryan et al. | |
| 6,991,304 B2 | 1/2006 | Villaume | |
| 7,014,146 B2 | 3/2006 | Villaume et al. | |
| 7,586,422 B2 | 9/2009 | Goodman et al. | |
| 7,818,100 B2 | 10/2010 | Goodman et al. | |
| 7,853,370 B2 | 12/2010 | Coulmeau et al. | |
| 7,916,042 B2 | 3/2011 | Constans | |
| 7,957,878 B2 | 6/2011 | Rado | |
| 8,060,261 B2 | 11/2011 | Goodman et al. | |
| 8,116,989 B2 | 2/2012 | Journade et al. | |
| 8,209,072 B2 | 6/2012 | Villaume et al. | |
| 8,224,507 B2 | 7/2012 | Edwards et al. | |
| 8,244,444 B2 | 8/2012 | Rado | |
| 8,565,992 B2 * | 10/2013 | Fuchs | B60L 7/06 701/22 |
| 9,299,261 B2 * | 3/2016 | Jones | B60T 8/1703 |
| 2001/0052562 A1 | 12/2001 | Ishihara et al. | |
| 2006/0243857 A1 * | 11/2006 | Rado | B60T 8/1703 244/111 |
| 2008/0215198 A1 | 9/2008 | Richards | |
| 2009/0048724 A1 | 2/2009 | Caule | |
| 2009/0292433 A1 | 11/2009 | Goodman et al. | |
| 2010/0079308 A1 | 4/2010 | Fabre et al. | |
| 2010/0299005 A1 | 11/2010 | Hugues | |
| 2010/0299039 A1 * | 11/2010 | Rado | B60T 8/1703 701/70 |
| 2011/0144875 A1 * | 6/2011 | Rado | B60T 8/1703 701/70 |
| 2011/0166723 A1 | 7/2011 | Valentova et al. | |

* cited by examiner

*Primary Examiner* — Thomas G Black
*Assistant Examiner* — Ana Thomas
(74) *Attorney, Agent, or Firm* — Baldauff IP, LLC; Michael J. Baldauff, Jr.

(57) ABSTRACT

Methods, systems, and computer-readable media are described herein for assessing aircraft braking performance and runway friction conditions. Aircraft data corresponding to characteristics of an aircraft during a landing event is received and used with a braking performance model to determine an indicator of braking performance. Estimated and brake metered pressures are compared to determine whether a friction-limited condition exists. The data then can be used to make an assessment of the runway friction characteristics and the associated braking capabilities of the runway.

18 Claims, 9 Drawing Sheets

AIRCRAFT BRAKING PERFORMANCE AND RUNWAY CONDITION DETERMINATION

CROSS REFERENCE TO RELATED APPLICATIONS

This application is a non-provisional application of U.S. Provisional Application Ser. No. 61/763,075 entitled "Determination of Airplane Braking Performance and Runway Friction Conditions," filed Feb. 11, 2013, which is incorporated herein by reference in its entirety.

BACKGROUND

During aircraft landing operations, numerous factors determine the rate and distance in which the aircraft slows from the aircraft speed at touchdown to the desired taxiing speed. These factors include, but are not limited to, the characteristics of the braking system of the aircraft; the rate, magnitude, and duration of the application of the brakes by the pilot; the use and characteristics of the thrust reverser system of the aircraft; the aerodynamic lift and drag, the touchdown speed, and mass associated with the aircraft; and the characteristics and friction conditions associated with the runway. The conditions of the runway may change significantly as environmental factors change. For example, rain, snow, and ice may affect the friction characteristics of the runway, which may dramatically change the distance required to slow an aircraft. In extreme situations, the low friction available from the runway could cause an aircraft to slide off of the runway or may prevent the aircraft from stopping in the available distance. Conventional aircraft systems do not provide real-time information as to the condition of an active runway or to the performance of an aircraft's braking systems.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Methods, systems, and computer-readable media are described herein for assessing an aircraft's braking performance and corresponding runway conditions. According to embodiments presented herein, aircraft data is received that corresponds to characteristics of the aircraft during the landing event. The aircraft data is used with a braking performance model to arrive at an output that correlates to the performance of the aircraft's braking system or to the condition of the runway associated with the landing event. The output is then provided to an end user.

According to another aspect, an estimated brake pressure over a duration of a landing event is determined. A brake metered pressure corresponding to the landing event is received and compared to the estimated brake pressure. A determination is made based on this comparison whether a friction-limited condition associated with the runway exists.

The features, functions, and advantages discussed herein can be achieved independently in various embodiments of the present disclosure or may be combined in yet other embodiments, further details of which can be seen with reference to the following description and drawings.

DETAILED DESCRIPTION

Figure 1:
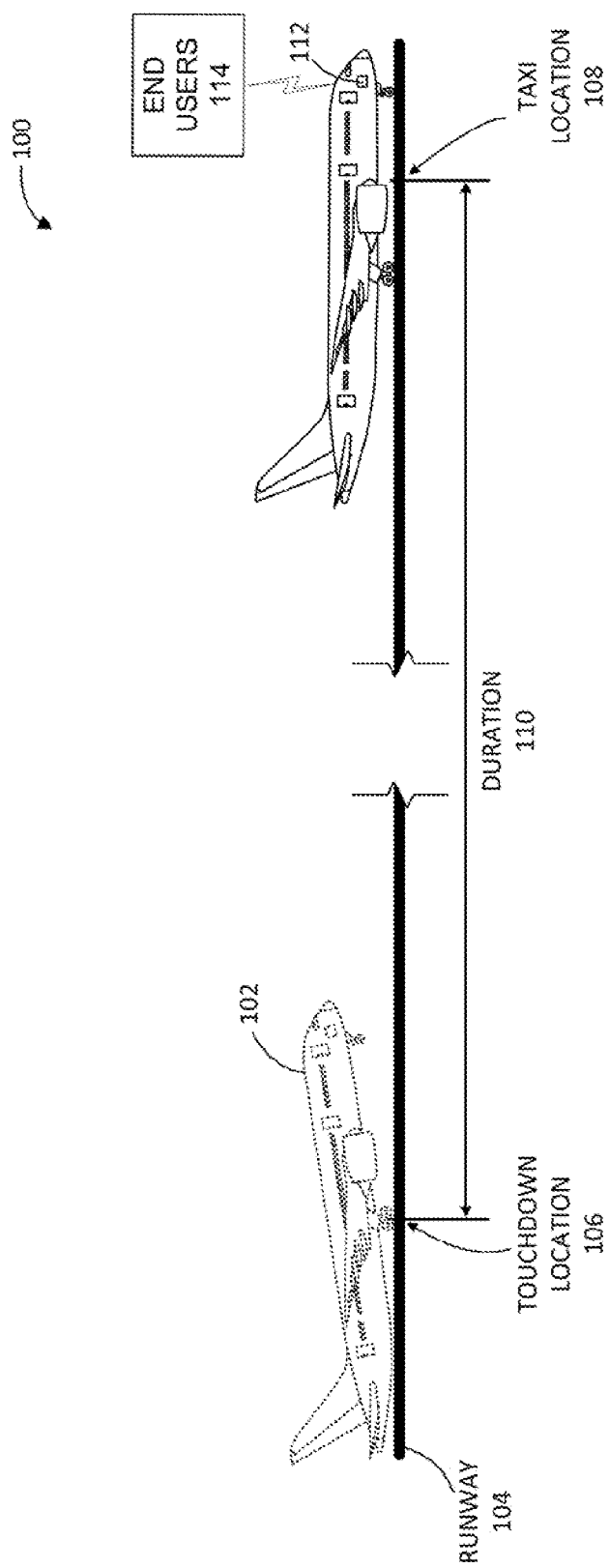
FIG. 1 is a side view of an aircraft during a landing event, in accordance with embodiments presented herein.

The following detailed description is directed to methods, systems, computer-readable media, and other suitable technologies for determining aircraft braking performance and runway friction conditions. As discussed above, runway conditions often change rapidly as ice, snow, or rain build up creates slippery conditions that could lead to runway overruns or other dangerous scenarios for landing aircraft. Conventional aircraft systems do not provide for real-time or near real-time (hereafter referred to as real-time) assessment and reporting of aircraft braking performance, which would provide valuable insight to potentially degrading runway surface conditions. According to the concepts and technologies described herein, an aircraft's braking performance may be assessed in real-time during a landing event and communicated to any number of downstream users immediately after.

During a landing event, numerous aircraft systems are used to slow the aircraft. For the purposes of this disclosure, these systems may be generally categorized as aerodynamic systems or drag, thrust reverser systems, and braking systems. Aerodynamic systems may be deployed to increase the aircraft's drag and destroy lift to assist in slowing the aircraft. Examples include, but are not limited to, flaps, slats, air brakes or spoilers, or any other type of deployable control surface, as well as the gear itself as it significantly increases the aerodynamic drag on the aircraft when deployed. Thrust reverser systems mechanically reverse the direction of the thrust from the engines to aid in slowing the aircraft. These systems create a significant force in a direction substantially opposite the aircraft's direction of travel that works in conjunction with the braking system to slow and stop the aircraft. Finally, braking systems respond to pilot input to apply a force that opposes the rotation of the aircraft wheels. Conventionally, the pilot will utilize all three types of systems to slow the aircraft after landing. For example, upon touchdown, the pilot may deploy spoilers and thrust reversers while applying pressure to the brake pedals, which translates to pressure applied to the aircraft brakes.

When a friction-limited condition arises with respect to the runway surface, such as the accumulation of snow or ice, the brake system will become less effective. Anti-skid systems may be utilized to modulate the pressure applied to the aircraft brakes in order to prevent skidding. While the anti-skid system of an aircraft is active, as well as anytime the braking system is not completely efficient or effective, the aerodynamic drag and thrust reverser systems may be utilized for a longer duration or to a greater degree in order to compensate for the decrease in brake performance and slow the aircraft appropriately.

Currently, large amounts of data corresponding to the operation of a large number of aircraft systems are recorded for download and use by maintenance or operations personnel in the future. The concepts described herein allow for the use of this data to analyze the aircraft's braking performance in real-time. The results of the analysis may be used in a number of ways. For example, real-time knowledge of braking performance may be useful for predicting brake wear and other brake system issues, for pilot training, for determining and tracking runway maintenance requirements, and for determining and predicting friction-limited runway conditions.

The disclosure below will discuss multiple methods for determining real-time braking performance. First, an energy model will be discussed. Using the energy model, aerodynamic and thrust energy utilized during landing events may be deducted from a calculated total kinetic energy associated with the aircraft during landing to arrive at a braking energy that represents the amount of total kinetic energy that may be attributed to the braking system during a landing. Next, a braking coefficient and stopping force generated by the landing gear may be determined utilizing aerodynamic and thrust models associated with the aircraft. The braking coefficient model produces a braking coefficient over time throughout the landing event. A braking model may then be used to determine an estimated brake pressure representing the pressure output from the anti-skid system by utilizing a defined brake pressure to torque relationship, calculating torque from data collected by the aircraft during the landing event and the calculated stopping force generated by the landing gear. The brake metered pressure applied to the brakes over the course of the landing event may be compared to the estimated brake pressure to determine any period of time during the landing event in which the aircraft experienced a friction-limited condition.

In the following detailed description, references are made to the accompanying drawings that form a part hereof and that show, by way of illustration, specific embodiments, or examples. In referring to the drawings, like numerals represent like elements throughout the several figures. FIG. 1 is a side view of an aircraft 102 during a landing event 100. For the purposes of this disclosure, the landing event 100 may include a duration 110 that defines a landing. The duration 110 may include a period of time calculated from the touchdown location 106 on the runway 104 to a taxi location 108. The touchdown location 106 may be determined as the location at which compression of a landing gear strut is detected or a determination of weight on wheels. The taxi location 108 may be determined as the time at which the aircraft 102 has slowed to a desired speed for taxiing, e.g. 30 knots. It should be appreciated that any pre-determined and measurable events may be used to define the beginning and end points of the landing event 100 without departing from the scope of this disclosure.

According to various embodiments described below, a braking performance determination system 112 analyzes braking performance associated with the landing event 100 and provides the results to end users 114. Examples of end users 114 include, but are not limited to, an airline maintenance center, an airline operational center, air traffic control, airport maintenance, or other aircraft, as well as a display in the cockpit of the aircraft 102 for notification to the pilot. As mentioned above, real-time knowledge of braking performance may be useful for predicting brake wear and other brake system issues, for pilot training, for landing distance assessments, for determining and tracking runway maintenance requirements, and for determining and predicting friction-limited runway conditions.

Figure 2:
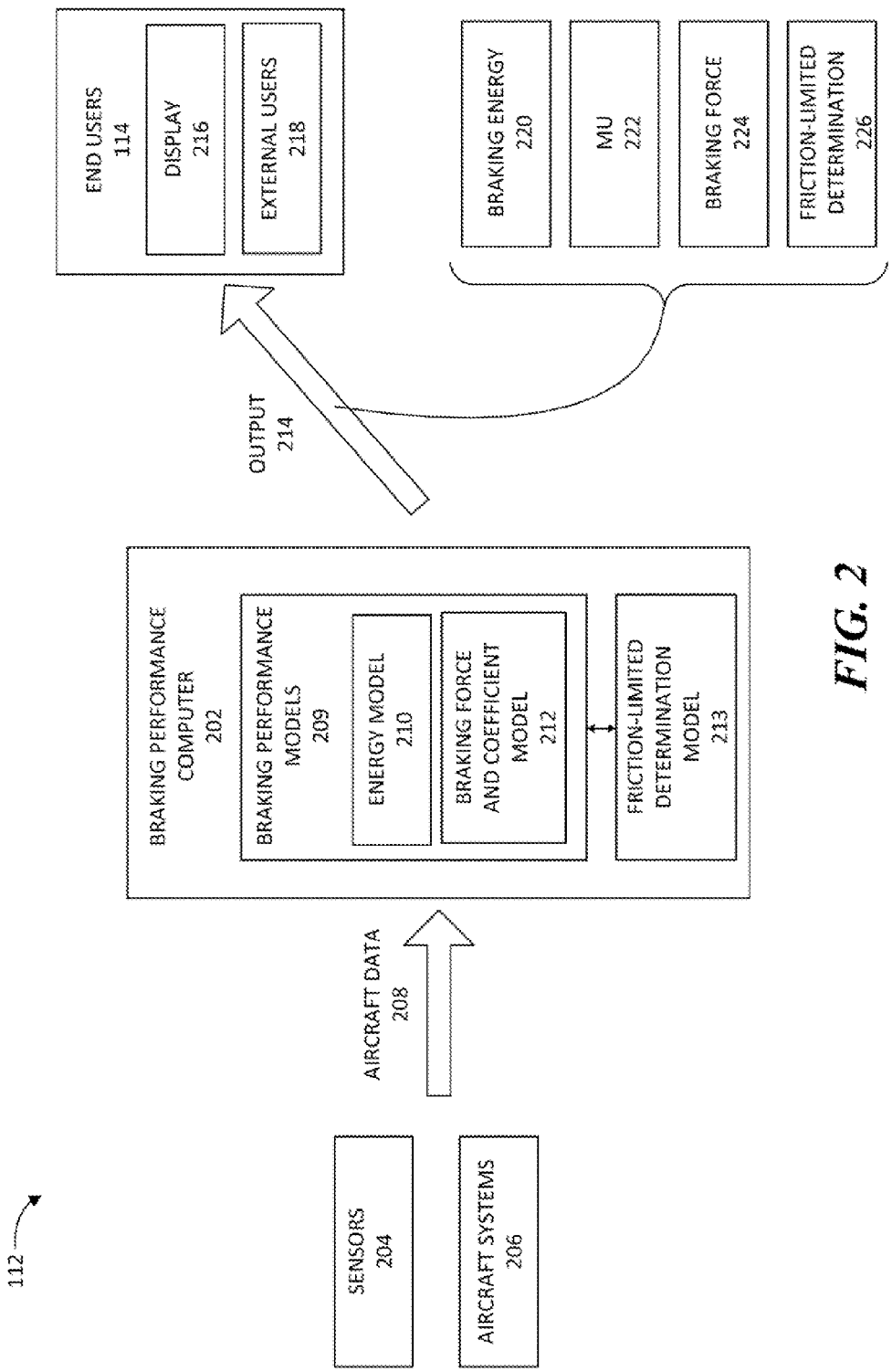
FIG. 2 is a block diagram of a braking performance determination system, in accordance with embodiments presented herein.

FIG. 2 shows a block diagram of a braking performance determination system 112. According to various embodiments, the braking performance determination system 112 may include a braking performance computer 202 that utilizes aircraft data 208 to provide an output 214 corresponding to the performance of the aircraft's brakes and/or runway conditions during the landing event 100. Examples of the aircraft data 208 may include, but are not limited to, ground speed, acceleration, applied brake metered pressure, temperature, engine N1, thrust reverser position, air/ground indication, weight, speedbrake or spoiler position, radio altitude, and flap settings. The aircraft data 208 may originate from any number and type of sensors 204 and aircraft systems 206 associated with the aircraft 102.

The braking performance computer 202 utilizes the aircraft data 208 to develop one or more braking performance models 209 that provide an output 214 in real-time that indicates the performance of the aircraft's braking system. Various outputs 214 will be discussed in detail with respect to various embodiments, but generally may include braking energy 220, a braking coefficient or t (hereinafter "Mu 222"), or a braking force 224. In addition, the braking performance computer 202 may utilize a friction-limited determination model 213 independently or in conjunction with the braking performance models 209 to provide a friction-limited determination 226 associated with the conditions of the runway 104 as output 214. The friction-limited determination model 213 and resulting friction-limited determination 214 will be described in detail below.

According to various embodiments, the braking performance models 209 may include an energy model 210 and/or a braking force and coefficient model 212. Generally, the energy model 210 provides the percentage of overall energy used to slow the aircraft that may be attributed to the braking system. This braking energy 220 may be provided in real-time as output 214 to end users 114, which may include a display 216 within the aircraft 102 or external users 218 outside the aircraft 102 for any number of uses such as tracking the performance of the aircraft's brake system for identifying or predicting brake wear and other brake system issues, or for use during pilot training Additionally, the output 214 may be used as an indication as to the condition of the runway, and more specifically, to determine and predict friction-limited runway conditions, as described in more detail below.

Alternatively, the braking force and coefficient model 212 produces an output 214 that includes a braking coefficient, or Mu 222. The Mu 222 is a direct indicator of the runway friction characteristics and the airplane's maximum stopping capability for that runway 104 at the time of the landing event 100. This is useful in determining if an airplane 102 is capable of landing on this runway 104 at its given weight, configuration, and atmospheric conditions. When a friction-limited condition exists with respect to the runway 104, the braking coefficient represents the runway friction characteristics. The braking force and coefficient model 212 may additionally or alternatively provide a braking force 224 as the output 214. The braking force 224 represents the amount of force applied through the braking system during the duration 110 or at any point during the landing event 100. As with the Mu 222, the braking force 224 can provide an indication of the braking performance of the aircraft 102, which may then be used to monitor the braking system, brake wear, the pilot stopping technique, or when compared to multiple landing events 100 on a particular runway 104, to detect or predict runway friction characteristics.

Figure 3:
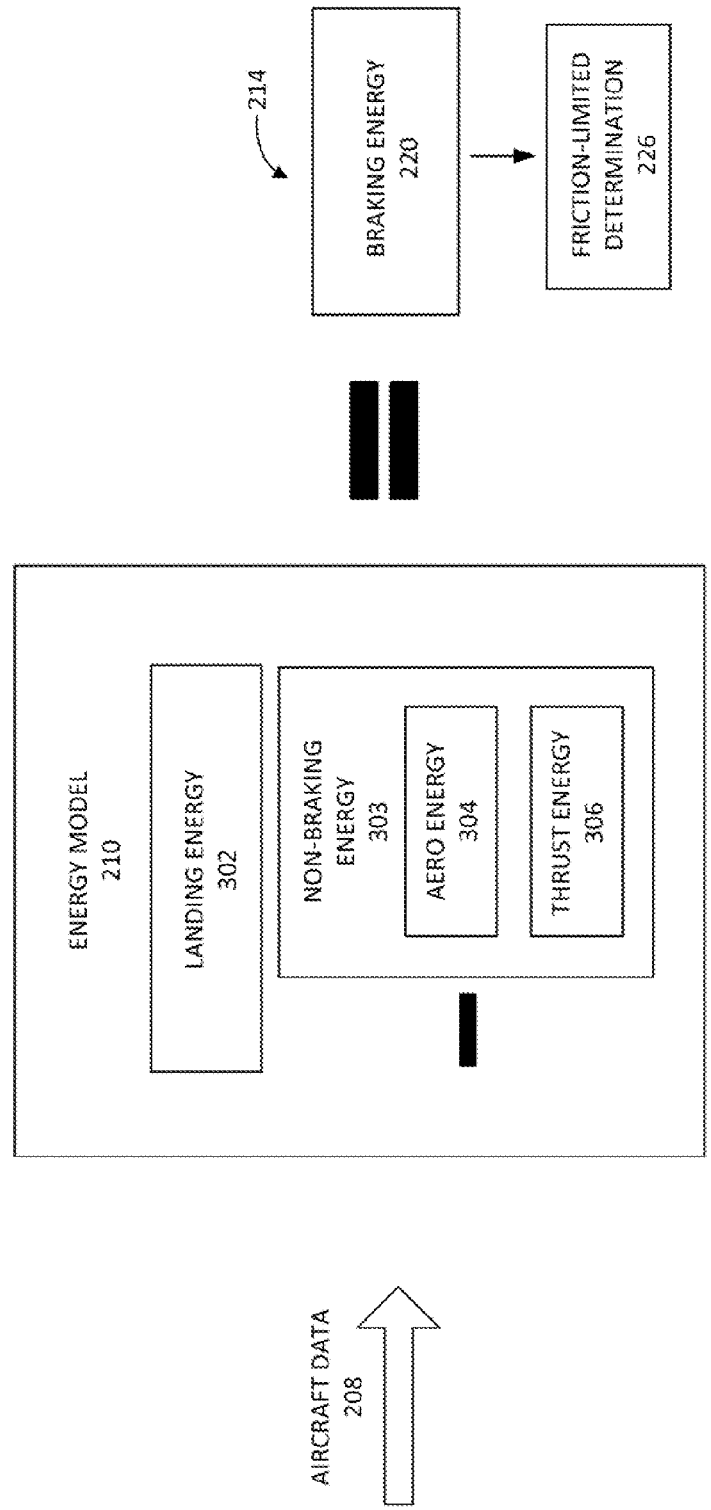
FIG. 3 is a block diagram illustrating various components of the energy model, in accordance with embodiments presented herein.

FIG. 3 shows a block diagram illustrating various components of the energy model 210. As shown in FIG. 3 and mentioned above, the energy model 210 utilizes real-time aircraft data 208 to determine a braking energy 220. The braking energy 220 represents the amount of kinetic energy associated with the aircraft 102 that is dissipated by the braking system during the duration 110 of the landing event 100. This energy model 210 provides a way to quantifiably measure the effectiveness of an aircraft's braking system. When compared with the braking energy 220 of the same aircraft 102 determined during past landing events 102, trends may be identified that provide indications as to brake wear, pilot operational discrepancies, or other issues.

When compared to the braking energy 220 of other aircraft preceding and following the aircraft 102 on a particular runway 104, trends of increasing or decreasing braking energy 220 may be identified that correspond to the frictional characteristics of the runway 104, providing a friction-limited determination 226. For example, as the braking energy 220 used by consecutive aircraft 102 during consecutive landing events 102 on a runway 104 decreases during snow or potential icing environmental conditions, perhaps decreasing dramatically, an inference may be made about the runway friction characteristics on the runway 104.

According to various embodiments, the landing energy 302 may be equivalent to the kinetic energy associated with the aircraft 102 at the touchdown location 106 or start of the landing event 100. The landing energy 302 may be represented by the formula Landing Energy=½$mv^2$, where m=the mass of the aircraft 102, and
v=the velocity of the aircraft 102

This landing energy 302 represents the energy that must be dissipated using the aerodynamic systems, thrust system, and braking system of the aircraft 102. To determine the braking energy 220 attributed to the braking system of the aircraft 102, the non-braking energy 303 may be subtracted from the total landing energy 302. The non-braking energy 303 may be categorized as aerodynamic energy 304 attributed to the aerodynamic systems, and the thrust energy 306 attributed to the engines.

According to one embodiment, the aerodynamic energy 304 may be estimated using the formula AERO Energy=∫DRAG($V_G$)dt, where DRAG=aerodynamic drag force
$V_G$=ground speed Generally, the aerodynamic energy 304 may be thought of in terms of the amount of energy absorbed by aerodynamic drag during the duration 110 of the landing event 100. The aerodynamic drag may depend on the characteristics of aircraft 102, including but not limited to, the position and characteristics of the spoilers, flaps, other control surfaces, and configurations of the aircraft 102. The aerodynamic energy 304 absorbed by the airplane can be analyzed at various points during the landing rollout or as a total at the end of the rollout.

Using the energy model 210, the thrust energy 306 may be estimated using the formula THRUST Energy=∫THRUST($V_G$)dt, where THRUST=thrust force
$V_G$=ground speed Generally, the thrust energy 306 may be thought of in terms of the amount of energy absorbed or produced by the engines during the duration 110 of the landing event 100. The thrust energy may depend on the characteristics of aircraft 102, including but not limited to, the position and characteristics of the thrust reverser positions, flaps, fan speed, engine pressure ratio, and Mach number of the aircraft 102. The thrust energy 306 absorbed by the airplane can be analyzed at various points during the landing rollout or as a total at the end of the rollout.

Once the aerodynamic energy 304 and thrust energy 306 are known, these energies may be subtracted from the landing energy 302. The resulting energy is the braking energy 220, which represents the amount of kinetic energy dissipated by the braking system during the duration 110 or at any point during the landing event 100. As previously discussed, the braking energy 220 provides an indication of the braking performance of the aircraft 102, which may then be used to monitor the braking system, the pilot stopping technique, or to when compared to multiple landing events 100 on a particular runway 104, to make a friction-limited determination 310 by detecting or predicting a runway friction characteristic.

Figure 4:
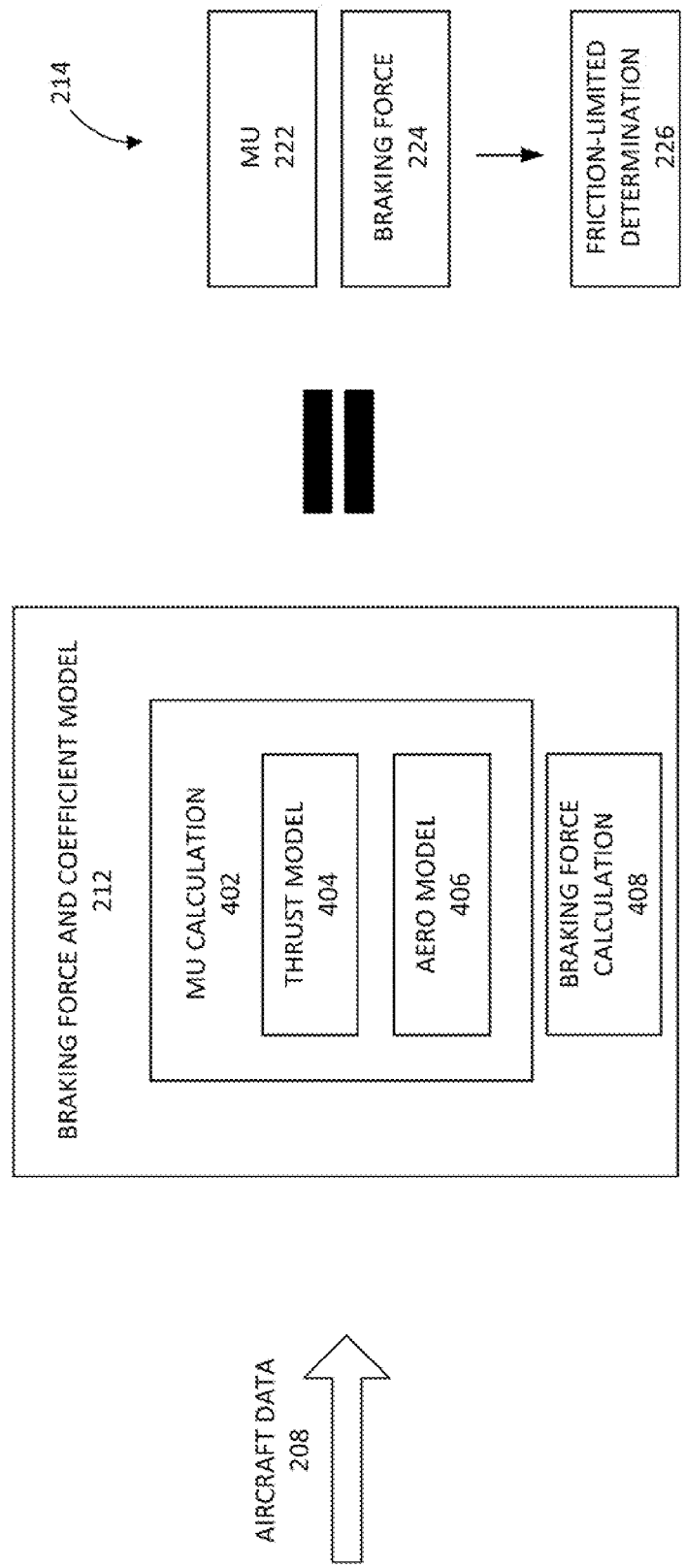
FIG. 4 is a block diagram illustrating various components of the braking coefficient model, in accordance with embodiments presented herein.

Turning now to FIG. 4, a block diagram illustrating various components of the braking force and coefficient model 212 will be described. The braking force and coefficient model 212 may be an alternative embodiment to the energy model 210. Using the braking force and coefficient model 212, an estimated braking force 224 and Mu 222, are calculated. The braking force 224 and Mu 222 may each be used as an indication as to the effectiveness of the braking system, the pilot stopping technique, and a measure of the runway's friction characteristics. It should be understood that alternative coefficients representing the runway friction could be calculated using the same 212 models.

The Mu calculation 402 utilizes the thrust model 404 and aerodynamic model 406 of the aircraft, similar to the aerodynamic energy 304 and thrust energy 306 used by the energy model 210. The thrust model 404 includes a determination of the thrust forces on the aircraft 102 that can be attributed to the aircraft engines during the landing event 100. Similarly, the aerodynamic model 406 includes a determination of the Drag and Lift forces on the aircraft 102 that can be attributed to the aerodynamic forces during the landing event 100. The Mu 222 may be estimated using the formula μ=BRAKING FORCE/($W$−LIFT), where BRAKING FORCE=[THRUST−DRAG−MA−W sin (slope)]
THRUST=engine thrust force
DRAG=aerodynamic drag force
M=aircraft mass
A=longitudinal acceleration W=weight,
Slope=runway slope
LIFT=aerodynamic lift force As stated above, the braking force 224 represents the amount of force applied through the braking system during the duration 110 or at any point during the landing event 100. The braking force and coefficient model 212 provides a braking force calculation 408, producing the braking force 224. The braking force 224 provides an indication of the braking performance of the aircraft 102, and when compared to multiple landing events 100 on a particular runway 104, to make a friction-limited determination 226.

Braking coefficient, μ or Mu 222, is the ratio of the gear deceleration (braking) force to the normal or vertical force. It describes the contribution of the deceleration generated by friction (from wheel braking and rolling resistance) and contaminant drag to the total deceleration. During landing rollouts the brakes may be either friction-limited (antiskid-limited) or torque-limited.

Friction-limited, sometimes referred to as antiskid-limited, means that the brakes are capable of generating more retarding force than the runway can actually sustain. In other words, an increase in brake application does not cause an increase in airplane braking coefficient. When this occurs, the available Mu 222 is limited by the amount of available friction (i.e. friction-limited) from the runway surface. Application of full braking without an antiskid system would cause the brakes to lockup and result in non-rotating wheels and skidding. The antiskid system prevents this condition by regulating the hydraulic pressure applied to the brakes to prevent wheel lockup and skidding, and maintain an optimal slip ratio to maximize stopping capability. In an friction-limited condition, the brake input or pressure applied (brake metered pressure) by the pilot or autobrake system is reduced by the antiskid system. The friction of the runway determines the amount of retarding force that can be sustained by the brakes. Therefore, in a friction-limited condition, the Mu 222 represents the maximum braking capability of the aircraft 102 and provides a measure of the runway friction characteristics.

Torque-limited means that the brakes are not generating enough torque to cause wheel lockup. In other words, the runway friction characteristics can support more retarding force than the brakes are currently supplying. Therefore, the retarding force is a direct function of the brake pressure applied (brake metered pressure) by the pilot or autobrake system.

The friction-limited determination model 213 discussed above with respect to the braking performance computer 202 provides a friction-limited determination 226 associated with the conditions of the runway 104. In doing so, the friction-limited determination model 213 may utilize the braking energy 220, the Mu 222, and/or the braking force 224 to compare with equivalent calculations associated with multiple landing events 100 on a particular runway 104 to arrive at the friction-limited determination 226. Alternatively, the friction-limited determination model 213 may calculate an estimated brake command output from the anti-skid system based on the calculated braking force 224 and the brake systems characteristics. The estimated brake command can then be compared to the brake input made by the pilot or autobrake system to determine if there was anti-skid system activity and a friction-limited condition.

According to one embodiment, the friction-limited determination 226 as to whether or not a friction-limited condition exists on the runway 104 may be made for a hydraulic brake system by estimating the brake pressure output from the antiskid system. For hydraulic brakes, the brake system characteristics can be described by a relationship between brake pressure applied to the brakes and the amount of torque or force generated. The friction-limited determination model 213 can take the calculated brake force 224 and determine a corresponding estimated brake pressure 510 output from the antiskid system. This estimated brake pressure 510 can then be used to make a friction-limited determination 226, or in other words, determine if a friction-limited condition exists. It should be understood that the applied brake input and estimated brake output from the antiskid system can be represented other parameters (force, energy, etc.) besides pressure for the friction-limited determination 226. In other words, while the example embodiment shown and described below with respect to FIG. 5 represents a friction-limited determination 226 utilizing a comparison of estimated and measured brake pressures, a friction-limited determination 226 may alternatively be based on a comparison of any other measured and estimated parameters, such as other forces and energies associated with slowing the aircraft 102.

Figure 5:
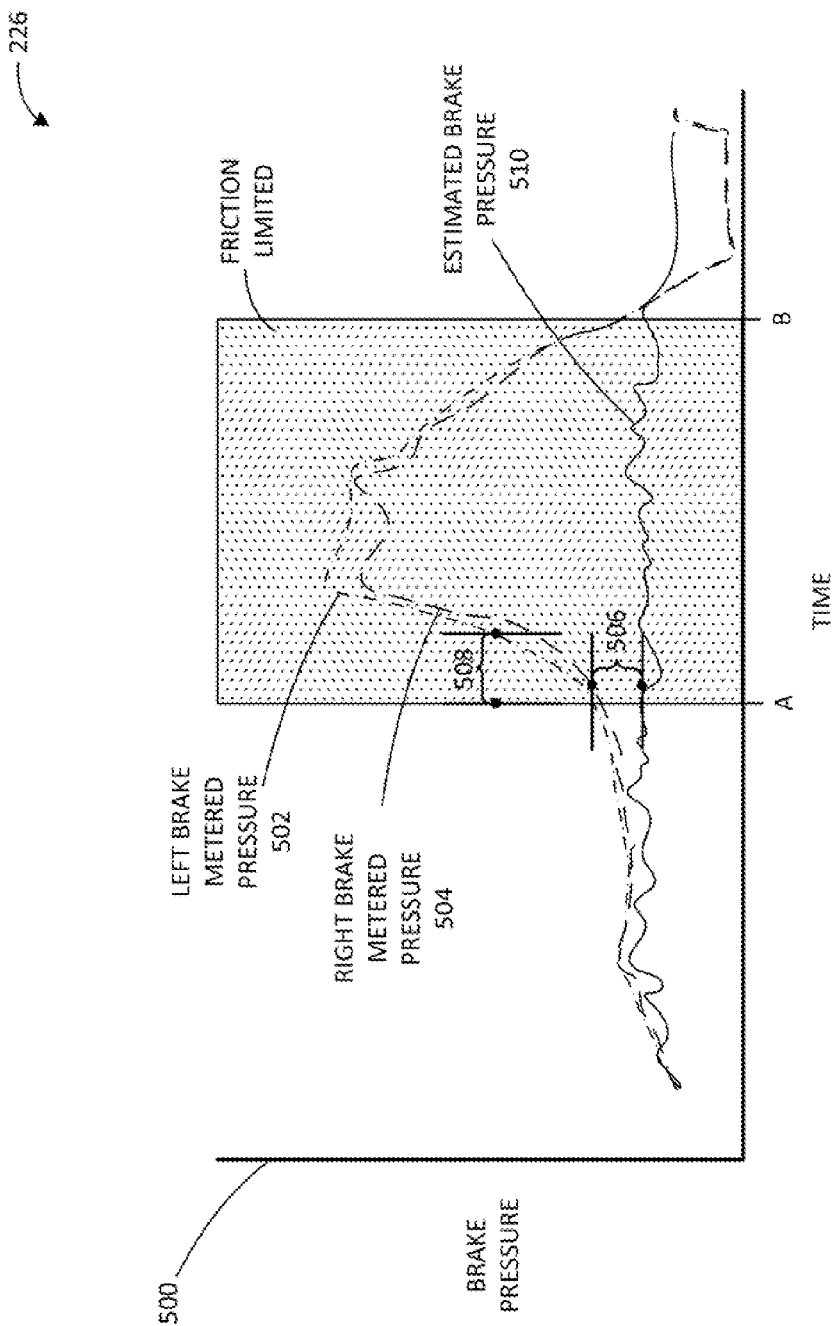
FIG. 5 is a brake pressure graph visually representing a friction-limited determination, in accordance with embodiments presented herein.

FIG. 5 shows a brake pressure graph 500 that visually represents the friction-limited determination 226 when comparing the estimated brake pressure 510 to pressures applied to the brake pedals by the pilots in a situation in which a friction-limited condition exists. The estimated brake pressure output from the brake model 408 is compared to the left 502 and right 504 brake metered pressures (brake input from the pilots or autobrakes) throughout the duration 110 of the landing event 100. The left brake metered pressure 502 and the right brake metered pressure 504 represent the brake metered pressures, which are measured and supplied to the braking performance computer 202 from the sensors 204 as aircraft data 208, applied by the pilot to the left and right brake pedals in the cockpit or autobrake system of the aircraft 102.

It can be seen in the brake pressure graph 500 that the left brake metered pressure 502 and the right brake metered pressure 504 lines approximately follow the estimated brake pressure 510 line until time A. Between times A and B, during the time period which is represented by the shaded rectangle, the plots representing the left brake metered pressure 502 and the right brake metered pressure 504 diverge away from the plot of the estimated brake pressure 510. During this time, the pilot may be increasing the pressure applied to the brake pedals, however, the estimated brake pressure 510 remains substantially constant, without increasing with the left brake metered pressure 502 and the right brake metered pressure 504. This may occur when a friction-limited condition exists and the anti-skid systems activate to modulate the brake pressure to prevent wheel skid regardless of the increased pressure applied to the brake pedals by the pilot. So by comparing the estimated brake pressure 510 calculated by the braking performance computer 202 to the brake metered pressure, the friction-limited determination 226 can be made. This determination can be done in real-time by the braking performance computer 202 to allow for appropriate notification and other appropriate actions to be taken by air traffic control or airline operations. In the friction-limited determination 226, consideration for brake system variability, brake wear variability, data measurement sensor issues, and data sample rates is made to ensure high confidence information. Therefore, the applied brake metered pressure (502, 504) should be greater than the estimated brake pressure 510 by a threshold margin 506 and for a threshold duration 508 that account for these considerations.

Figure 6:
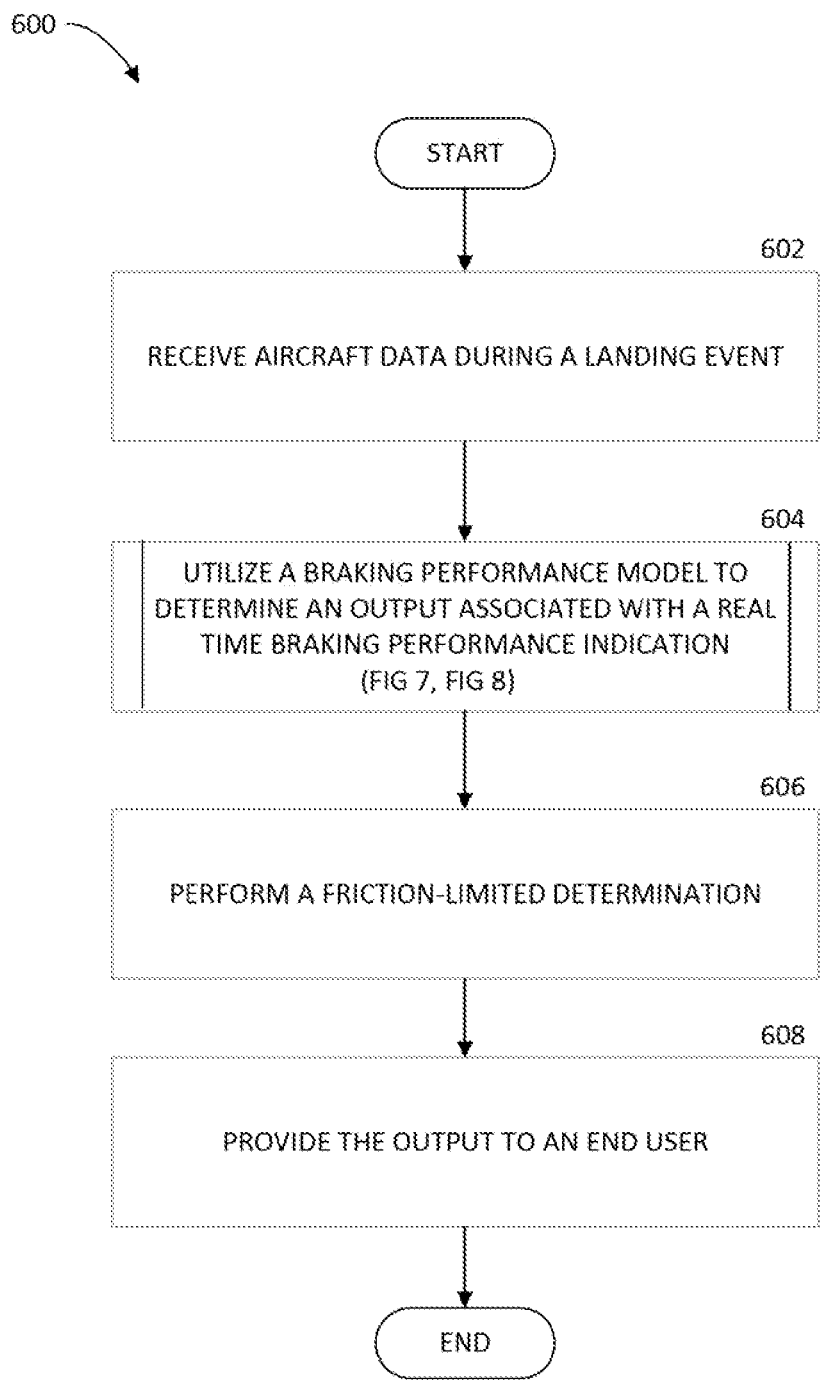
FIG. 6 is a flow diagram illustrating a method for determining aircraft braking performance and detecting friction-limited runway conditions utilizing a braking performance model, in accordance with embodiments presented herein.

FIG. 6 shows a routine 600 for determining aircraft braking performance and detecting friction-limited runway conditions utilizing a braking performance model 209. In some embodiments, the routine 600 may be performed by the braking performance computer 202. The routine 600 begins at operation 602, where aircraft data 208 is received from any number and type of sensors 204 or aircraft systems 206. The routine 600 continues to operation 604, where a braking performance model 209 is used to determine an output 214. As discussed in detail above, the braking performance model 209 may include an energy model 210 or a braking force and coefficient model 212. The use of the energy model 210 will be described below with respect to FIG. 7, while the use of the braking force and coefficient model 212 will be described below with respect to FIG. 8. The output 214 determined by one or both of the braking performance models 209 may include an indication of braking performance, such as a braking energy 220, Mu 222, or braking force 224. From operation 604, the routine 600 continues to operation 606, where the friction-limited determination model 213 provides a friction-limited determination 226. As discussed above, this determination may be made by comparing the braking energy 220, the Mu 222, and/or the braking force 224 to equivalent calculations associated with multiple landing events 100 on a particular runway 104, or may be made by comparing the estimated brake pressure 510 calculated by the braking performance computer 202 to the brake metered pressure, as shown in FIG. 5. At operation 608, the output 214, which may include the braking energy 220, the Mu 222, the braking force 224, the friction-limited determination 226, or any combination thereof, is provided to an end user 114. The end user 114 may include a display 216 within the aircraft 102 or an external user 218. After providing the output 214, the routine 600 ends.

Figure 7:
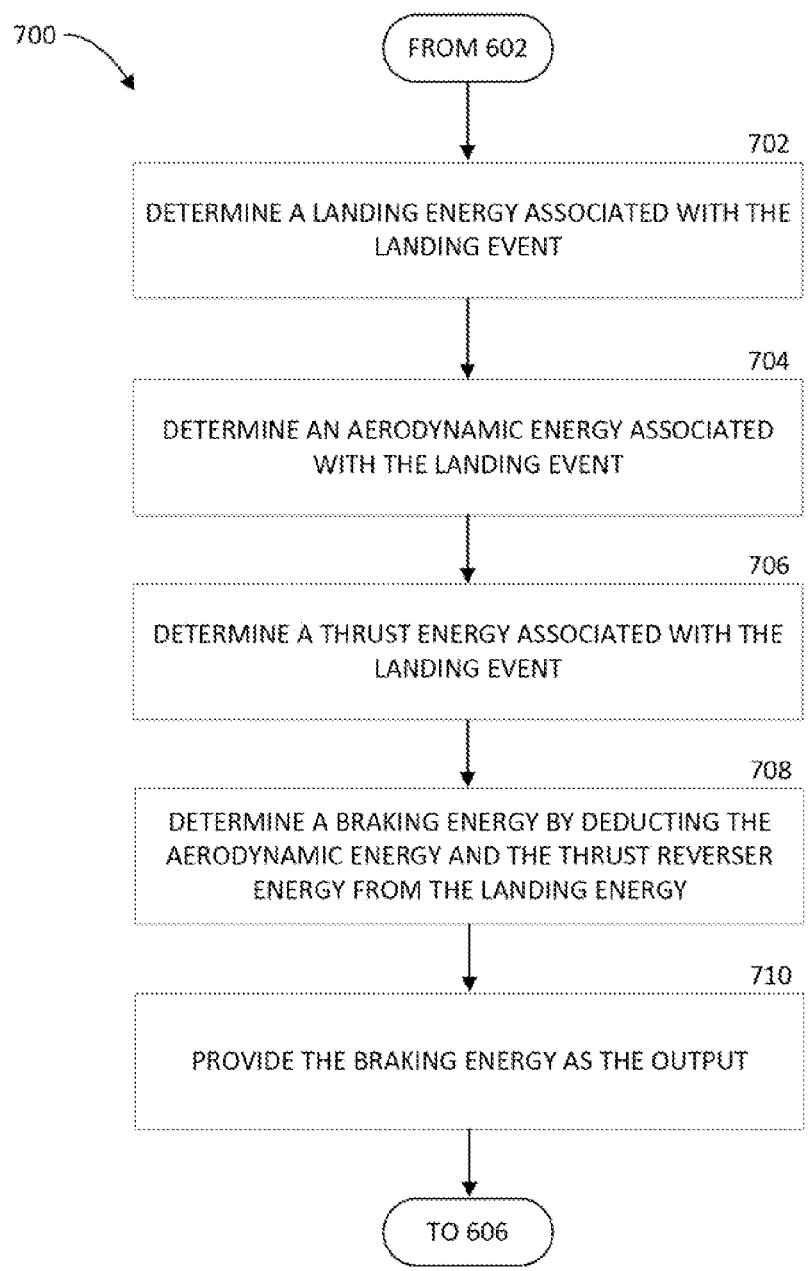
FIG. 7 is a flow diagram illustrating the method of FIG. 6 utilizing an energy model, in accordance with embodiments presented herein.

FIG. 7 shows a routine 700 corresponding to operation 604 in which the braking performance model 209 includes the energy model 210. Utilizing the energy model 210, the routine 700 begins at operation 702, where a landing energy 302 is determined for the aircraft 102 at the touchdown location 106 or start of the landing event 100. From operation 702, the routine 700 continues to operation 704, where an aerodynamic energy 304 is determined for the aircraft 102 during the landing event 100, and at operation 706, a thrust energy 306 is determined. The routine 700 continues to operation 708, where a braking energy 220 is determined by subtracting the aerodynamic energy 304 and the thrust energy 306 from the landing energy 302. The resulting energy, the braking energy 220, may be considered the quantity of kinetic energy that the aircraft 102 possessed at the beginning of the landing event 100 that was dissipated by the braking system. From operation 708, the routine 700 continues to operation 710, where the braking energy 220 is provided as output 214, and the routine 700 returns to operation 606 of FIG. 6 and continues as described above.

Figure 8:
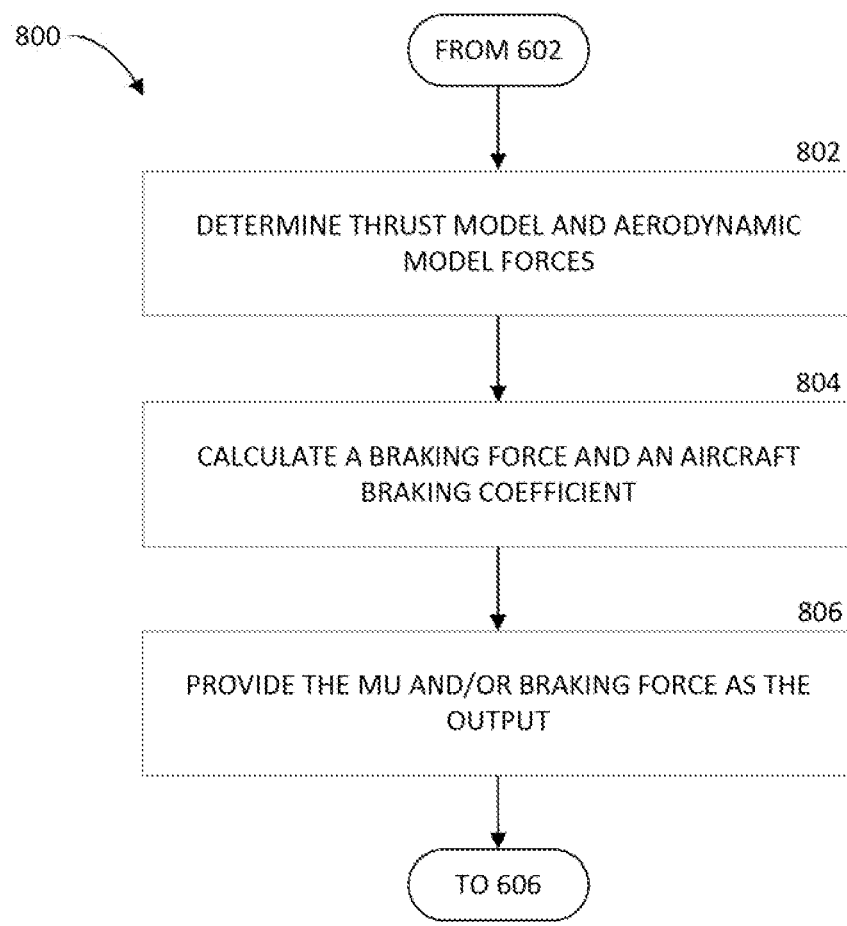
FIG. 8 is a flow diagram illustrating the method of FIG. 6 utilizing a braking coefficient model, in accordance with embodiments presented herein.

FIG. 8 shows a routine 800 corresponding to operation 604 in which the braking performance model 209 includes the braking force and coefficient model 212. Utilizing the braking force and coefficient model 212, the routine 800 begins at operation 802, where a thrust model 404 and aerodynamic model 406 are determined for the aircraft 102 for the landing event 100. The thrust model 404 and aerodynamic model 406 include a determination of the thrust, lift, and drag forces on the aircraft 102. From the thrust model 404, aerodynamic model 406, and aircraft data 208, the braking force 224 and Mu 222 are calculated at operation 804, and provided as output 214 at operation 806. The routine 800 then returns to operation 606 of FIG. 6 and continues as described above.

Figure 9:
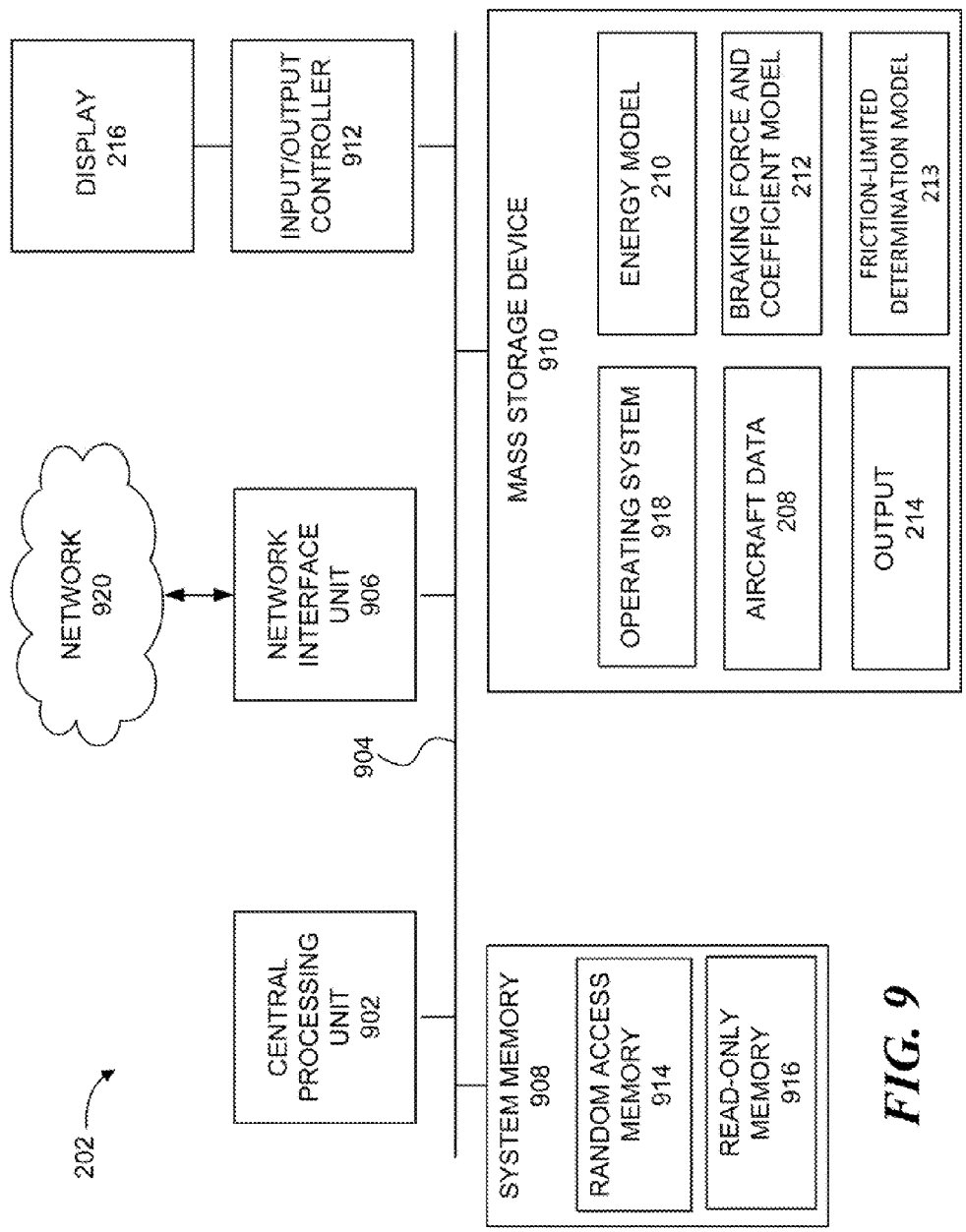
FIG. 9 is a block diagram showing an illustrative computer hardware and software architecture for a computing system capable of implementing aspects of the embodiments presented herein.

FIG. 9 shows an illustrative braking performance computer 202 capable of executing the software elements described herein for determining aircraft braking performance and runway conditions. The braking performance computer 202 may be embodied in single computing device or in a combination of one or more processing units, storage units, and/or other computing devices. The braking performance computer 202 includes one or more central processing units 902 ("CPUs"), a system memory 908, including a random access memory 914 ("RAM") and a read-only memory 916 ("ROM"), and a system bus 904 that couples the memory to the CPUs 902.

The CPUs 902 may be standard programmable processors that perform arithmetic and logical operations necessary for the operation of the braking performance computer 202. The CPUs 902 may perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The braking performance computer 202 also includes a mass storage device 910. The mass storage device 910 may be connected to the CPUs 902 through a mass storage controller (not shown) further connected to the bus 904. The mass storage device 910 and its associated computer-readable media provide non-volatile, non-transitory storage for the braking performance computer 202. The mass storage device 910 may store an operating system 918, as well as specific application modules or other program modules, such as the energy model 210, the braking force and coefficient model 212, and the friction-limited determination model 213 described above in regard to FIGS. 2-5. The mass storage device 910 may also store data collected or utilized by the various systems and modules, such as the aircraft data 208 and output 214 associated with the braking performance determination system 112 described above.

The braking performance computer 202 may store programs and data on the mass storage device 910 by transforming the physical state of the mass storage device to reflect the information being stored. The specific transformation of physical state may depend on various factors, in different implementations of this disclosure. Examples of such factors may include, but are not limited to, the technology used to implement the mass storage device 910, whether the mass storage device is characterized as primary or secondary storage, and the like. For example, the braking performance computer 202 may store information to the mass storage device 910 by issuing instructions through the storage controller to alter the magnetic characteristics of a particular location within a magnetic disk drive device, the reflective or refractive characteristics of a particular location in an optical storage device, or the electrical characteristics of a particular capacitor, transistor, or other discrete element in a solid-state storage device. Other transformations of physical media are possible without departing from the scope and spirit of the present description, with the foregoing examples provided only to facilitate this description. The braking performance computer 202 may further read information from the mass storage device 910 by detecting the physical states or characteristics of one or more particular locations within the mass storage device.

Although the description of computer-readable media contained herein refers to a mass storage device, such as a hard disk or CD-ROM drive, it should be appreciated by those skilled in the art that computer-readable media can be any available computer media that can be accessed by the braking performance computer 202. Computer-readable media includes communication media, such as signals, and computer-readable storage media. By way of example, and not limitation, computer-readable storage media includes volatile and non-volatile, removable and non-removable media implemented in any method or technology for the storage of information, such as computer-readable instructions, data structures, program modules, or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information in a non-transitory fashion and which can be accessed by the braking performance computer 202. According to one embodiment, the braking performance computer 202 may have access to computer-readable storage media storing computer-executable instructions that, when executed by the computer, perform the routines 600, 700, and 800 for assessing aircraft braking performance and determining friction-limited conditions, as described above in regard to FIGS. 6-8.

According to various embodiments, the braking performance computer 202 may operate in a networked environment using logical connections to remote computers through a network, such as the network 920. The braking performance computer 202 may connect to the network 920 through a network interface unit 906 connected to the bus 904. It should be appreciated that the network interface unit 906 may also be utilized to connect to other types of networks and remote computer systems. The braking performance computer 202 may also include an input/output controller 912 for providing output to a display 216, such as a flight deck display, computer monitor, a printer, or other type of output device. The input/output controller 912 may further receive input from devices, such as a keyboard, mouse, electronic stylus, touch screen, and the like. It will be further appreciated that the braking performance computer 202 may not include all of the elements shown in FIG. 9, may include other elements that are not explicitly shown in FIG. 9, or may utilize an architecture completely different than that shown in FIG. 9.

Based on the foregoing, it should be appreciated that technologies for determining assessing an aircraft's braking performance and determining friction-limited runway conditions are provided herein. Although the subject matter presented herein has been described in language specific to computer structural features, methodological acts, and computer-readable media, it is to be understood that the disclosure defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A computer-implemented method for assessing the braking performance of an aircraft during a landing event, the method comprising:
   receiving aircraft data corresponding to characteristics of the aircraft during the landing event;
   utilizing the aircraft data and a braking performance model to determine an output associated with the braking performance;
   comparing the output to additional outputs from additional aircraft to determine a friction-limited condition; and
   providing the output in real-time to an end user.

2. The method of claim 1, wherein the braking performance model comprises an energy model corresponding to kinetic energy of the aircraft at a start of the landing event.

3. The method of claim 2, wherein utilizing the aircraft data and the braking performance model to determine the output associated with the braking performance or runway condition comprises:
   determining a landing energy associated with the landing event;
   determining non-braking energy associated with the landing event; and
   subtracting the non-braking energy from the landing energy to determine a braking energy associated with the landing event,
   wherein the output comprises the braking energy.

4. The method of claim 3, further comprising:
   comparing the braking energy to additional braking energy information from additional aircraft to determine a friction-limited condition, wherein the output comprises the runway condition corresponding to the friction-limited condition.

5. The method of claim 1, wherein the braking performance model comprises a braking coefficient model corresponding to an estimated braking coefficient of the aircraft during the landing event.

6. The method of claim 5, wherein utilizing the aircraft data and the braking performance model to determine the output associated with the braking performance comprises:
   determining a thrust model corresponding to thrust forces associated with the aircraft;
   determining an aerodynamic model corresponding to lift and drag forces; and
   utilizing the thrust model and the aerodynamic model to determine an aircraft braking coefficient ("Mu"),
   wherein the output comprises the Mu.

7. The method of claim 5, wherein utilizing the aircraft data and the braking performance model to determine the output associated with the braking performance comprises:
   determining a braking force associated with the aircraft, wherein the output comprises the braking force.

8. The method of claim 1, further comprising:
   determining an estimated parameter over a duration of the landing event;
   receiving a measured parameter over the duration of the landing event;
   comparing the estimated parameter to the measured parameter; and
   in response to comparing the estimated parameter to the measured parameter, determining whether a friction-limited condition exists, wherein the output comprises a friction-limited determination.

9. The method of claim 8, wherein the estimated parameter comprises an estimated brake pressure, wherein the measured parameter comprises a brake metered pressure, and wherein determining whether the friction-limited condition exists comprises:
- determining if the estimated brake pressure and the brake metered pressure diverge by a threshold margin for a threshold duration during the landing event; and
- if the estimated brake pressure and the brake metered pressure diverge by the threshold margin for the threshold duration during the landing event, determining that the friction-limited condition exists.

10. The method of claim 8, wherein determining the estimated brake pressure over the duration of the landing event comprises:
- determining a relationship between brake pressure and torque;
- calculating the torque over the duration of the landing event; and
- determining the estimated brake pressure over the duration of the landing event according to the relationship.

11. A non-transitory computer-readable storage medium comprising computer-executable instructions that, when executed by a computer, cause the computer to:
- receive aircraft data corresponding to characteristics of an aircraft during a landing event;
- utilize the aircraft data and a braking performance model to determine an output associated with a braking performance;
- compare the output with additional outputs from additional aircraft to make a friction-limited determination as to whether a friction-limited condition exists; and
- provide the output associated with the braking performance and the friction-limited determination to an end user.

12. The non-transitory computer-readable storage medium of claim 11, wherein the braking performance model comprises a braking force and coefficient model corresponding to an estimated braking coefficient of the aircraft during the landing event, and wherein causing the computer to utilize the aircraft data and the braking performance model to determine the output associated with the braking performance comprises causing the computer to:
- determine a thrust model corresponding to thrust forces associated with the aircraft;
- determine an aerodynamic model corresponding to lift and drag forces; and
- utilize the thrust model and the aerodynamic model to determine a Mu,
- wherein the output comprises the Mu.

13. The non-transitory computer-readable storage medium of claim 11, wherein the braking performance model comprises a braking force and coefficient model, and wherein causing the computer to utilize the aircraft data and the braking performance model to determine the output associated with the braking performance comprises causing the computer to calculate the braking force associated with the aircraft during the landing event, wherein the output comprises the braking force.

14. The non-transitory computer-readable storage medium of claim 11, wherein causing the computer to compare the output with additional outputs from additional aircraft to make the friction-limited determination as to whether the friction-limited condition exists comprises causing the computer to:
- calculate the braking force or Mu associated with the aircraft during the landing event;
- compare the braking force or Mu with a plurality of braking forces or a plurality of Mu's associated with a plurality of landing events; and
- in response to comparing, determining whether the friction-limited condition exists.

15. The non-transitory computer-readable storage medium of claim 11, wherein causing the computer to compare the output with additional outputs from additional aircraft to make the friction-limited determination as to whether the friction-limited condition exists comprises causing the computer to:
- determine an estimated brake pressure over a duration of the landing event;
- receive a brake metered pressure over the duration of the landing event;
- compare the estimated brake pressure to the brake metered pressure; and
- in response to comparing the estimated brake pressure to the brake metered pressure, determine whether a friction-limited condition exists.

16. The non-transitory computer-readable storage medium of claim 11, wherein the braking performance model comprises an energy model corresponding to kinetic energy of the aircraft at a start of the landing event, and wherein causing the computer to utilize the aircraft data and the braking performance model to determine the output associated with the braking performance comprises causing the computer to:
- determine a landing energy associated with the landing event;
- determine non-braking energy associated with the landing event; and
- subtract the non-braking energy from the landing energy to determine a braking energy associated with the landing event,
- wherein the output comprises the braking energy.

17. The non-transitory computer-readable storage medium of claim 16, wherein causing the computer to compare the output with additional outputs from additional aircraft to make the friction-limited determination as to whether the friction-limited condition exists comprises causing the computer to compare the braking energy to additional braking energy information from additional aircraft to determine whether the friction-limited condition exists.

18. A system for assessing braking performance of an aircraft during a landing event to detect a friction-limited condition, the system comprising:
- a processor;
- a memory communicatively coupled to the processor; and
- a program module which executes in the processor from the memory and which, when executed by the processor, causes the processor to:
  - determine an estimated brake pressure over a duration of the landing event;
  - receive a brake metered pressure over the duration of the landing event;
  - compare the estimated brake pressure to the brake metered pressure;
  - determine if the estimated brake pressure and the brake metered pressure substantially diverge during the landing event;
  - if the estimated brake pressure and the brake metered pressure substantially diverge during the landing event, determine that a friction-limited condition exists;

receive aircraft data corresponding to characteristics of the aircraft during the landing event;
utilize the aircraft data and a braking performance model to determine an output associated with the braking performance and the friction-limited condition; and
providing the output to an end user.

* * * * *